UNITED STATES PATENT OFFICE.

OSCAR WENDLER, OF LEIPSIC, GERMANY, ASSIGNOR TO DR. N. GERBER'S CO. GESELLSCHAFT MIT BESCHRAENKTER HAFTUNG, OF LEIPSIC, GERMANY.

METHOD OF TESTING MILK.

No. 827,591.  Specification of Letters Patent.  Patented July 31, 1906.

Application filed February 28, 1906. Serial No. 303,566.

*To all whom it may concern:*

Be it known that I, OSCAR WENDLER, a subject of the King of Prussia, German Emperor, and a resident of Leipsic, Germany, have invented a certain new and useful Improvement in Methods of Testing Milk, of which the following is a specification.

The methods for rapid determination of the fat in milk and the like are based on this that the fat-incasing materials in solution and the fat are separated entirely by means of centrifugal force. The only centrifugal method heretofore found to be practical is that of Gerber. According to Gerber's method the substance to be experimented with is well mixed with concentrated sulfuric acid, with an addition of amyl alcohol, and after being centrifugalized the layer of fat is read off at about 70° centigrade. Although for Gerber's method the employment of such a high temperature, which may even be increased by mixing the substance under analysis with concentrated sulfuric acid, has not proved to be prejudicial for experimental results, yet the handling of a butyrometer at such a high temperature is inconvenient for many. It may also happen that the rubber stopper closing the butyrometer may spring out in consequence of the high temperature and the operator might be injured by the sulfuric acid bursting out.

Under the present invention the employment of concentrated sulfuric acid and also of a high temperature is avoided. Instead of sulfuric acid being employed as a solvent for the albuminous materials incasing the fat there is employed an alkaline solution to which tartaric salts are added. The maximum temperature allowed with the improved method is from about 45° to 50° centigrade, at which no trouble is experienced in handling the butyrometer.

It is not broadly new to employ alkalies for the determination of the fat in milk. One of the oldest methods—that of Marchand, as also that of Soxhlet—is based thereon. Neither of these methods was, however, a method of rapidly determining the proportion of fat. Recently another method has been proposed—the so-called "sinacid" method—which also avoids the use of acid and is based on the employment of trisodium phosphate. Apart from the consideration that the practicability of the sinacid method is doubtful (see the article by Dr. M. Popp, "Die Sinacid Butyrometrie," in the *Molkerei-Zeitung*, Hildesheim, 18th Vol., No. 53) with the sinacid method the temperature reached is about 85°, whereas it is a primary object of the present invention to avoid such high temperatures. With such temperatures, as in the case of the sinacid method, there is a danger of saponification of the fat, which is avoided in Gerber's method, owing to the acid nature of the reagents. According to the present invention, which avoids the use of acid, the proportions are so chosen that a perfect separation of the fat is effected, but without saponification. A further important advantage of the present invention is that the butyrometers presently in use can be employed without change, requiring the same quantities of milk and of liquid reagent, the measuring instruments in use being suited therefor.

As in the case of Gerber's acid method, there is also added under my invention a small quantity of a high-boiling alcohol, such as amyl alcohol or isobutyl alcohol, butyl alcohol, or propyl alcohol, either pure or diluted with low-boiling alcohols.

It has been determined that a proportion of only six per cent. hydrate suffices for the liquid reagent serving for the separation of the fat. As the tartaric salt I have found most desirable Rochelle salt—*i. e.*, potassio-sodic-tartrate.

Experiments have shown that the duration of the reaction may be shortened if sodium chlorid be added to the liquid reagent, the further advantage resulting that corresponding to the addition of sodium chlorid the proportion of alcohol may be diminished, whereby greater exactitude in the results is obtained.

As an example I introduce into the butyrometer in the following order: eleven cubic centimeters liquid reagent, (about ten per cent. NaOH, about five per cent. Rochelle salt, about ten per cent. NaCl,) ten cubic centimeters milk, 0.6 cubic centimeters isobutyl alcohol, or a suitable quantity of the above-named alcohols, and close the instrument with a dry rubber stopper, which is driven in so far that the liquid stands in the upper half of the scale. The contents of the butyrometer are shaken up and thoroughly mixed by turning the instrument upside down three times, in which in order to effect perfect mixture care has to be taken that each time the instrument is turned upside down the liquid should always flow entirely down. The butyrometer is then brought for two or three minutes into a water-bath at about 45°, then removed, again well shaken and mixed by turning the instrument upside down two or three times, and centrifugalized for about three minutes at the rate of eight hundred to twelve hundred revolutions per minute. The butyrometer is then placed for some minutes in the water-bath and the reading then taken at about 45°.

Having now described my invention, what I claim, and desire to secure by Letters Patent of the United States, is—

1. The improved method of determining rapidly the proportion of fat in milk and the like consisting in reacting on the milk with alkali together with tartaric salts at a temperature of about 45°, and separating the fat from the solution by centrifugal action.

2. The improved method of determining rapidly the proportion of fat in milk and the like consisting in reacting on the milk with alkali together with tartaric salts and sodium chlorid, and separating the fat from the solution by centrifugal action.

In testimony whereof I have signed my name to this specification in the presence of two subscribing witnesses.

OSCAR WENDLER.

Witnesses:
R. FAUDEI,
R. WITZSCHEL.